US011959306B1

(12) United States Patent
Espinosa-Ulloa

(10) Patent No.: US 11,959,306 B1
(45) **Date of Patent: *Apr. 16, 2024**

(54) LOCK WITH KEY HAVING EXPANDING ARM ELEMENTS

(71) Applicant: Daniel Espinosa-Ulloa, San Bernadino, CA (US)

(72) Inventor: Daniel Espinosa-Ulloa, San Bernadino, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 17/462,141

(22) Filed: Aug. 31, 2021

Related U.S. Application Data

(63) Continuation-in-part of application No. 17/202,428, filed on Mar. 16, 2021.

(51) Int. Cl.

| | |
|---|---|
| ***E05B 35/00*** | (2006.01) |
| ***E05B 19/00*** | (2006.01) |
| ***E05B 19/14*** | (2006.01) |

(52) U.S. Cl.
CPC ........ *E05B 35/004* (2013.01); *E05B 19/0017* (2013.01); *E05B 19/14* (2013.01)

(58) Field of Classification Search
CPC ............. E05B 19/0052; E05B 19/0058; E05B 19/0064; E05B 19/007; E05B 19/14; E05B 35/003; E05B 35/004; E05B 35/14; E05B 49/002; E05B 49/004; E05B 67/04
See application file for complete search history.

(56) References Cited

U.S. PATENT DOCUMENTS

| | | | | | |
|---|---|---|---|---|---|
| 507,408 | A * | 10/1893 | Bole | E05B 35/004 | 70/399 |
| 827,201 | A * | 7/1906 | Ash et al. | E05B 35/004 | 70/399 |
| 1,054,525 | A * | 2/1913 | Giacometti | E05B 35/004 | 70/399 |
| 1,464,194 | A * | 8/1923 | Bartolacelli | E05B 35/004 | 70/38 A |
| 1,482,249 | A * | 1/1924 | Pagliuco | E05B 35/004 | 70/399 |
| 1,523,635 | A * | 1/1925 | Csima | E05B 35/003 | 70/398 |
| 3,765,199 | A | 10/1973 | Wiczer | | |
| 5,170,651 | A * | 12/1992 | Errani | E05B 35/004 | 70/395 |

(Continued)

FOREIGN PATENT DOCUMENTS

DE 102005046127 4/2007

*Primary Examiner* — Christopher J Boswell
(74) *Attorney, Agent, or Firm* — Kyle A. Fletcher, Esq.

(57) ABSTRACT

The lock with key having expanding arm elements is a lock. The lock with key having expanding arm elements comprises a body structure and a key structure. The key structure inserts into the body structure. The key structure rotates within the body structure to release the locking elements of the lock with key having expanding arm elements. The key structure comprises a plurality of rotating blade structures. Each of the plurality of rotating blade structures interact with an independent lock mechanism selected from a plurality of lock mechanisms contained in the body structure. The rotation of each rotating blade structure within its associated independent lock mechanism releases the locking elements of the lock with key having expanding arm elements.

17 Claims, 12 Drawing Sheets

(56) References Cited

U.S. PATENT DOCUMENTS

| | | | | | |
|---|---|---|---|---|---|
| 5,724,841 | A * | 3/1998 | Botteon | ................ | E05B 35/004 70/395 |
| 8,482,411 | B1 | 7/2013 | Brown | | |
| 9,115,511 | B1 | 8/2015 | Schmidt | | |
| 9,512,641 | B2 | 12/2016 | Delande | | |
| 9,663,975 | B2 | 5/2017 | Castro | | |
| D902,008 | S | 11/2020 | Fan | | |
| 2004/0148989 | A1 | 8/2004 | Hsieh | | |
| 2006/0272372 | A1 * | 12/2006 | Talamonti | ............. | E05B 35/004 70/358 |
| 2010/0326149 | A1 | 12/2010 | Chang | | |

* cited by examiner

LOCK WITH KEY HAVING EXPANDING ARM ELEMENTS

CROSS REFERENCES TO RELATED APPLICATIONS

This non-provisional application claims priority under 35 USC 120 to U.S. non-provisional application U.S. Ser. No. 17/202,428 filed on Mar. 16, 2021 by the inventor: Daniel Espinosa-Ulloa. This non-provisional application claims U.S. non-provisional application U.S. Ser. No. 17/202,428 in its entirety.

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of locks including guards for locks.

SUMMARY OF PRIOR DISCLOSURE

The prior disclosure is an electromechanical lock mechanism. The prior disclosure comprises a key structure, a lock structure, and a lock control circuit. The lock structure is a fastening device. The lock structure secures the position of a first object relative to a second object. The lock structure is a releasable structure such that the position of the first object relative to the second object can be adjusted after the lock structure is released. The lock control circuit is an electric circuit. The lock control circuit forms an electronic locking mechanism that fastens and releases the locking structure. The key structure is a multi-blade structure that controls the operation of the lock control circuit.

SUMMARY OF INVENTION

The lock with key having expanding arm elements is an extension of the prior disclosure.

The lock with key having expanding arm elements is a lock. The lock with key having expanding arm elements comprises a body structure and a key structure. The key structure inserts into the body structure. The key structure rotates within the body structure to release the locking elements of the lock with key having expanding arm elements. The key structure comprises a plurality of rotating blade structures. Each of the plurality of rotating blade structures interacts with an independent lock mechanism selected from a plurality of lock mechanisms contained in the body structure. The rotation of each rotating blade structure within its associated independent lock mechanism releases the locking elements of the lock with key having expanding arm elements.

These together with additional objects, features and advantages of the lock with key having expanding arm elements will be readily apparent to those of ordinary skill in the art upon reading the following detailed description of the presently preferred, but nonetheless illustrative, embodiments when taken in conjunction with the accompanying drawings.

In this respect, before explaining the current embodiments of the lock with key having expanding arm elements in detail, it is to be understood that the lock with key having expanding arm elements is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the lock with key having expanding arm elements.

It is therefore important that the claims be regarded as including such equivalent construction insofar as they do not depart from the spirit and scope of the lock with key having expanding arm elements. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
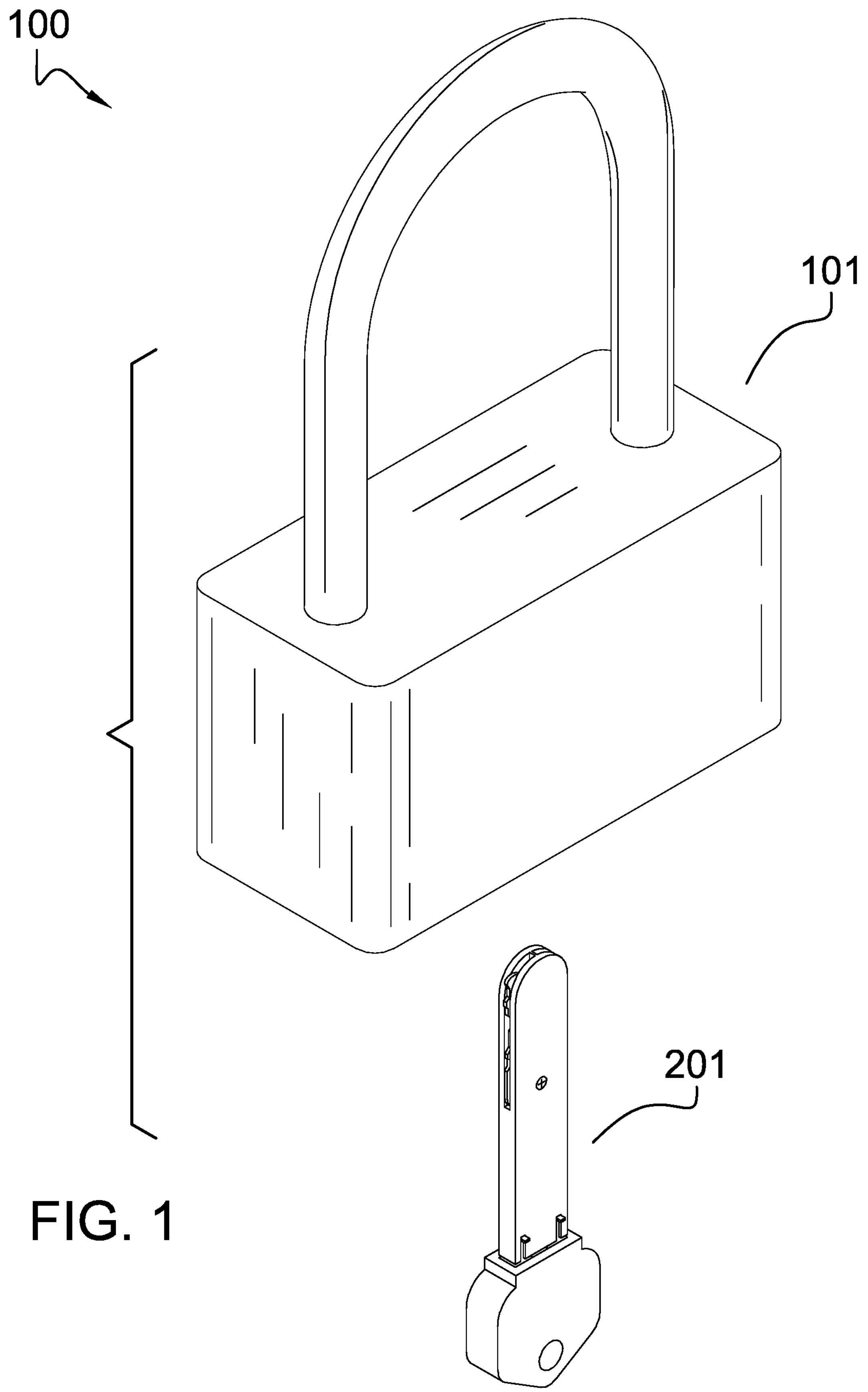
FIG. 1 is a perspective view of an embodiment of the disclosure.
Figure 2:
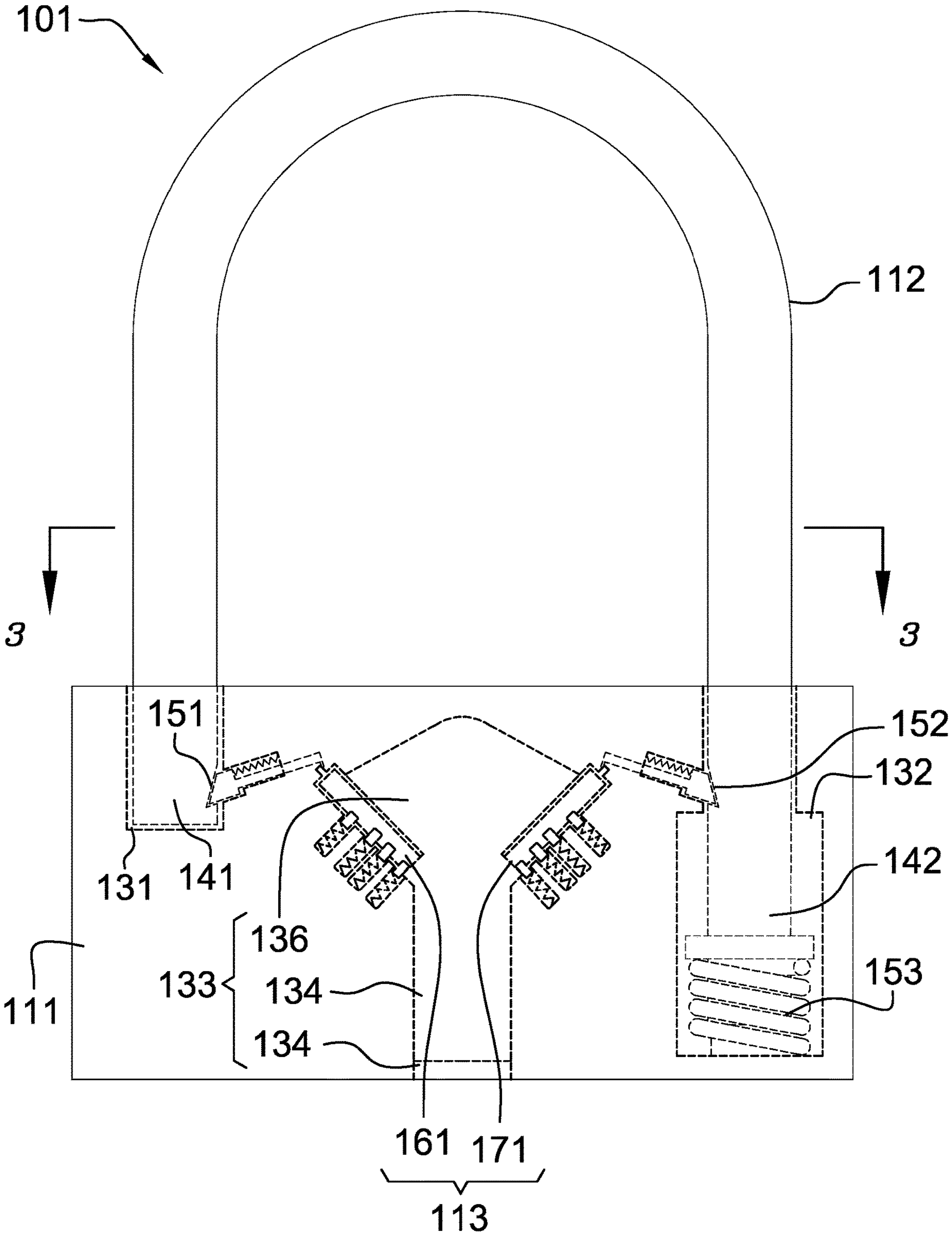
FIG. 2 is a front view of an embodiment of the disclosure.
Figure 3:
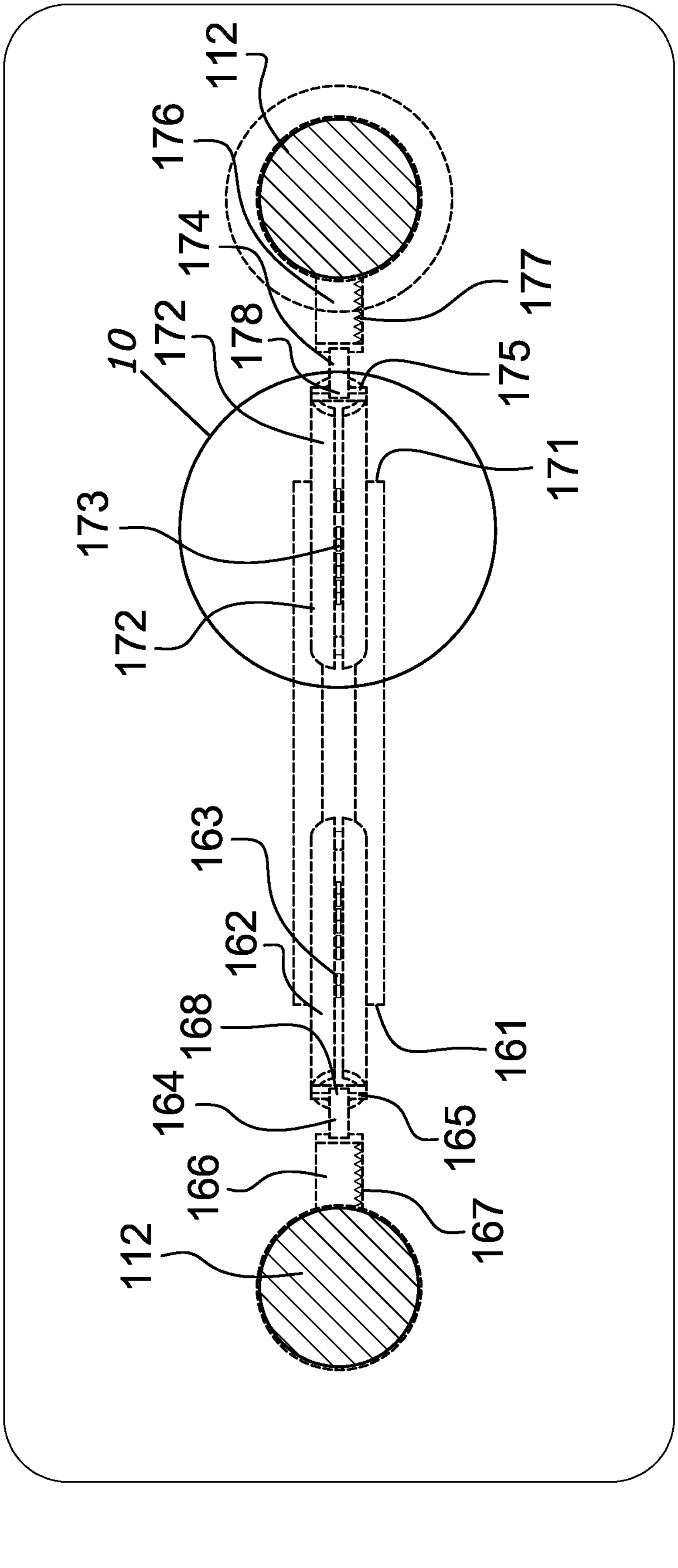
FIG. 3 is a cross-sectional view of an embodiment of the disclosure across 3-3 as shown in FIG. 2.
Figure 4:
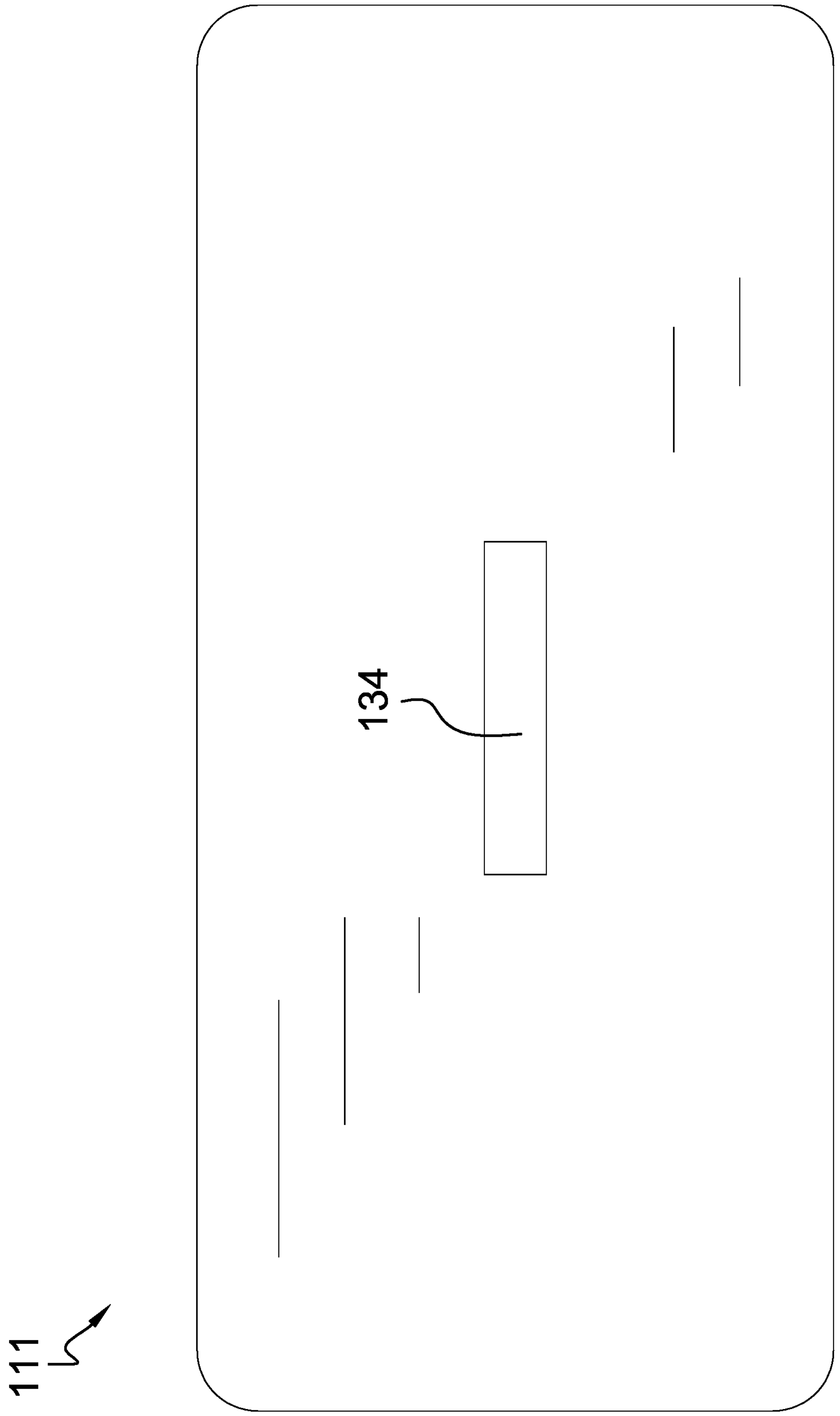
FIG. 4 is a bottom view of an embodiment of the disclosure.
Figure 5:
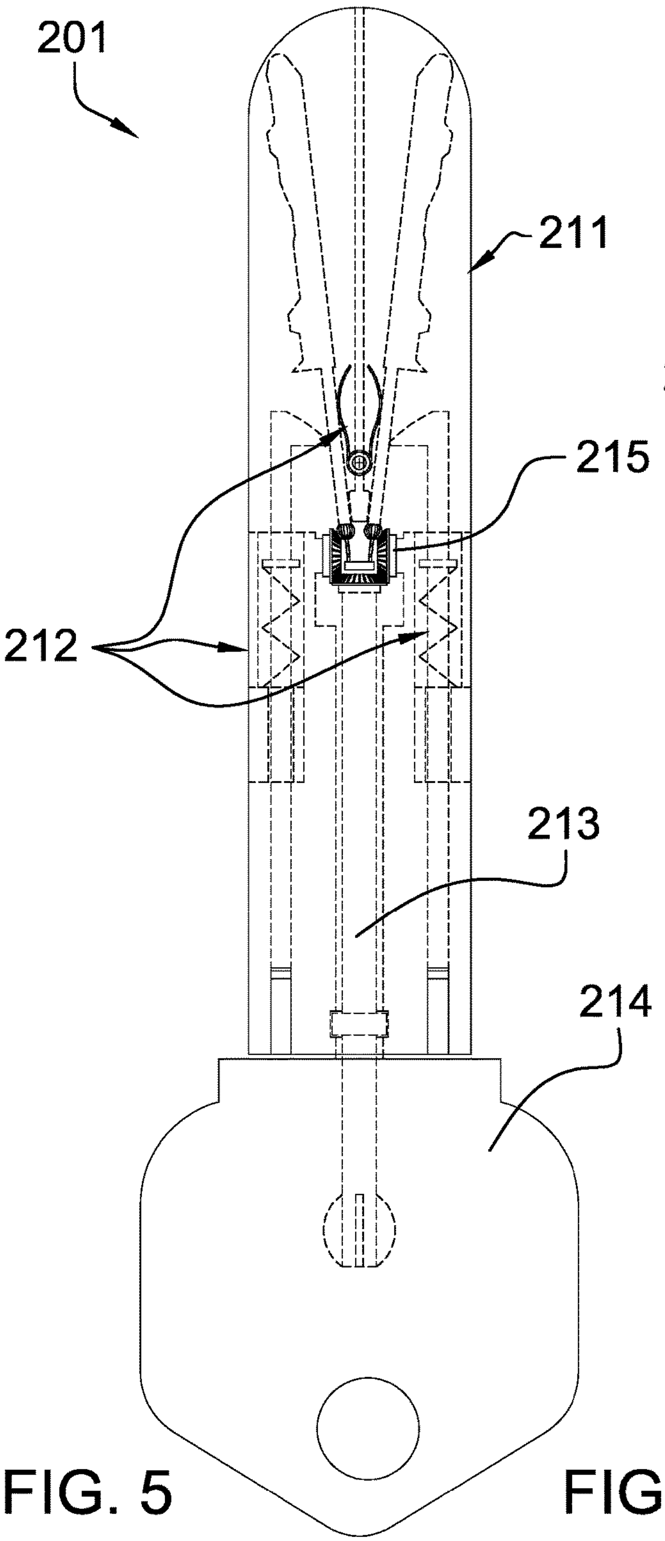
FIG. 5 is a detail view of an embodiment of the disclosure.
Figure 6:
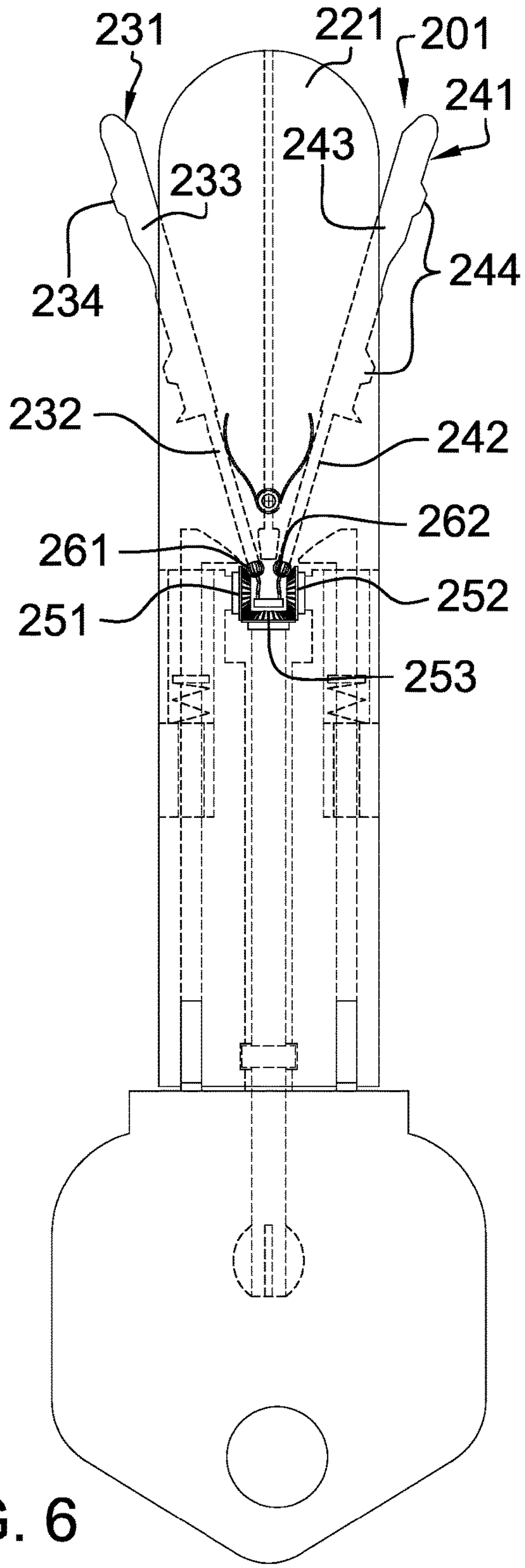
FIG. 6 is a detail view of an embodiment of the disclosure.
Figure 7:
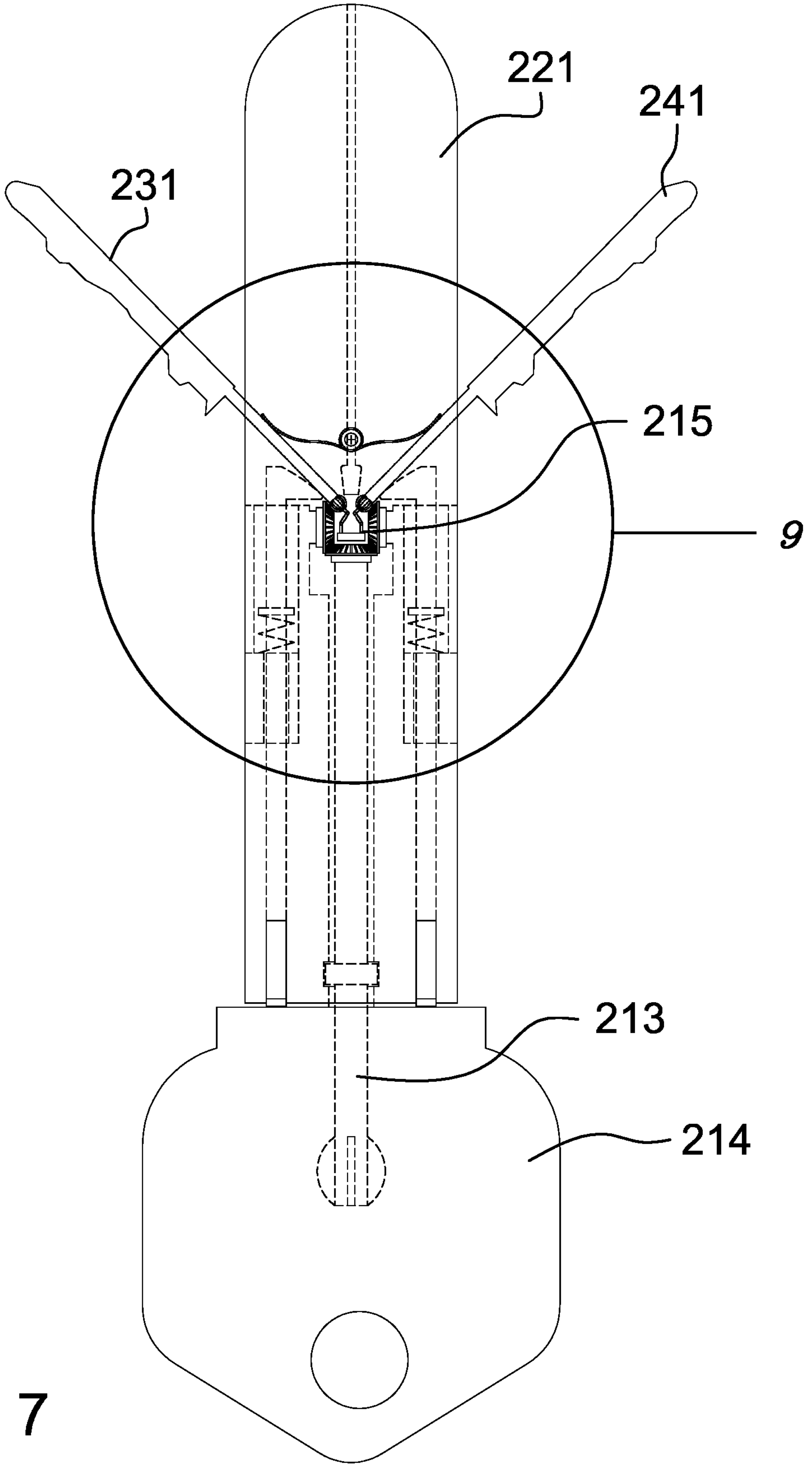
FIG. 7 is an in-use view of an embodiment of the disclosure.
Figure 8:
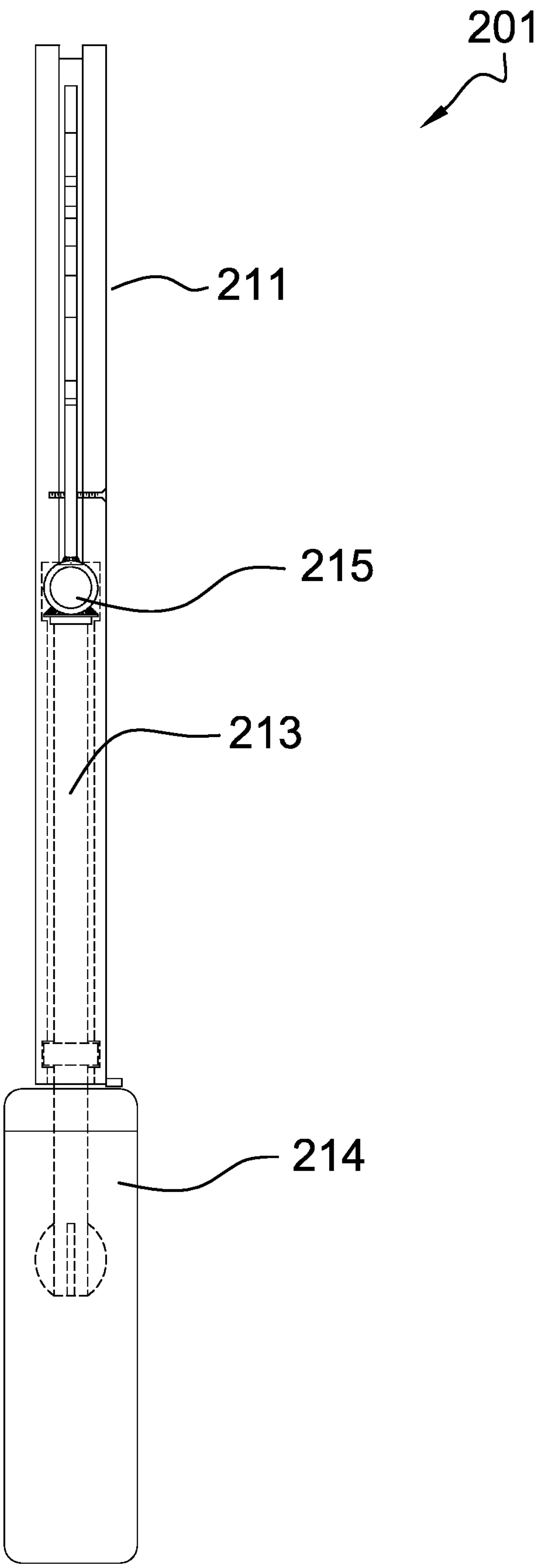
FIG. 8 is a side view of an embodiment of the disclosure.
Figure 9:
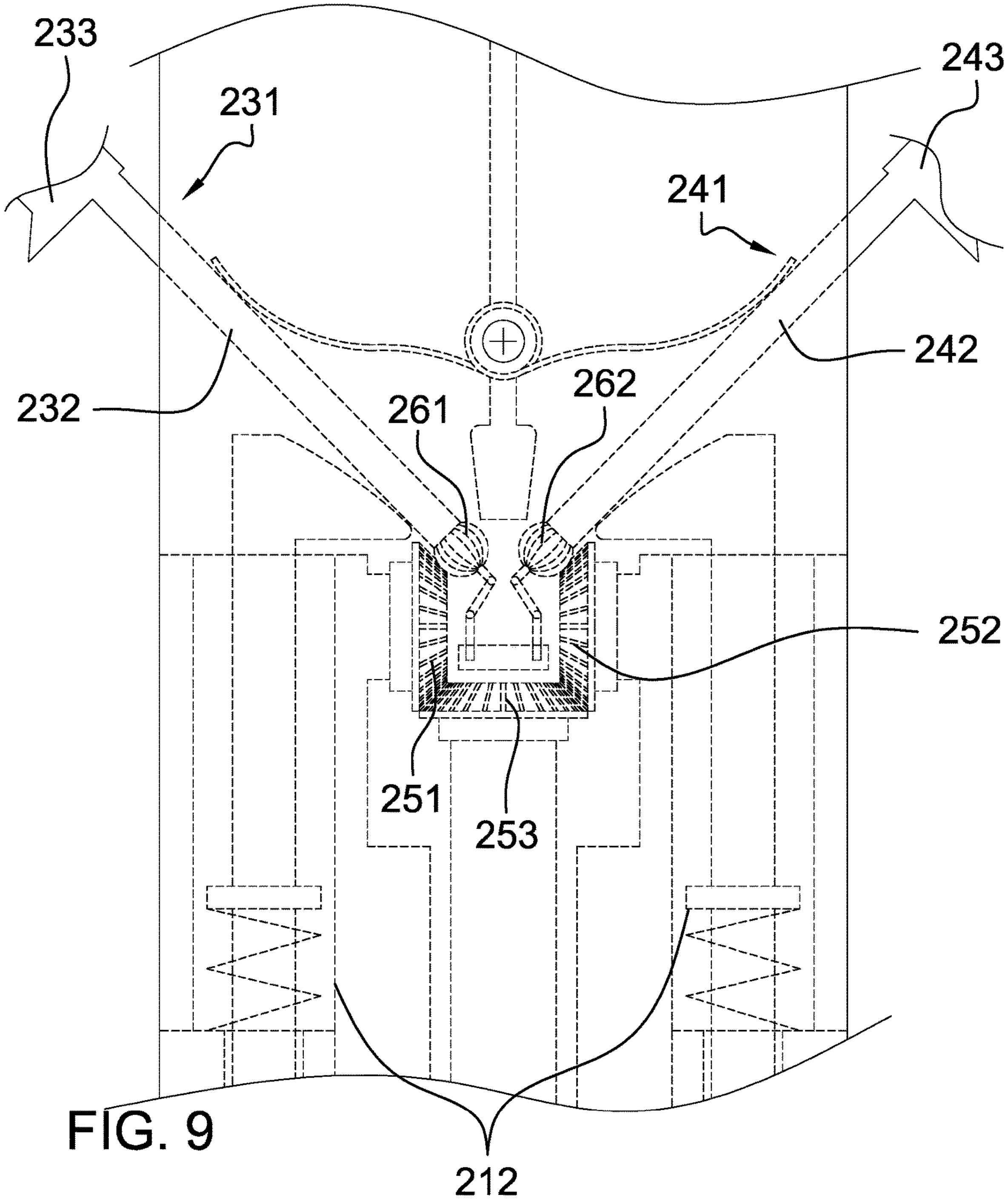
FIG. 9 is a detail view of an embodiment of the disclosure.
Figure 10:
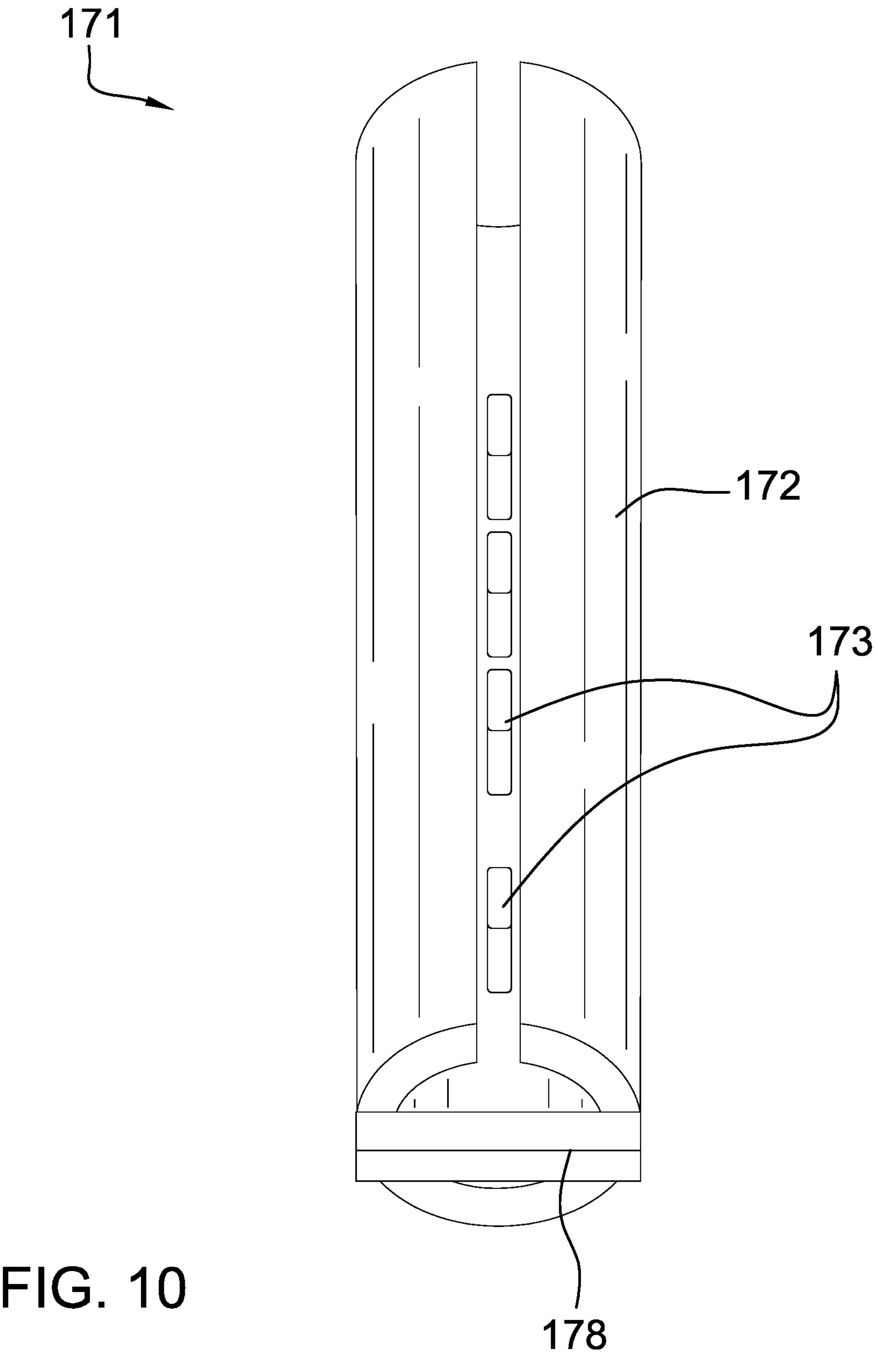
FIG. 10 is a detail view of an embodiment of the disclosure.
Figure 11:
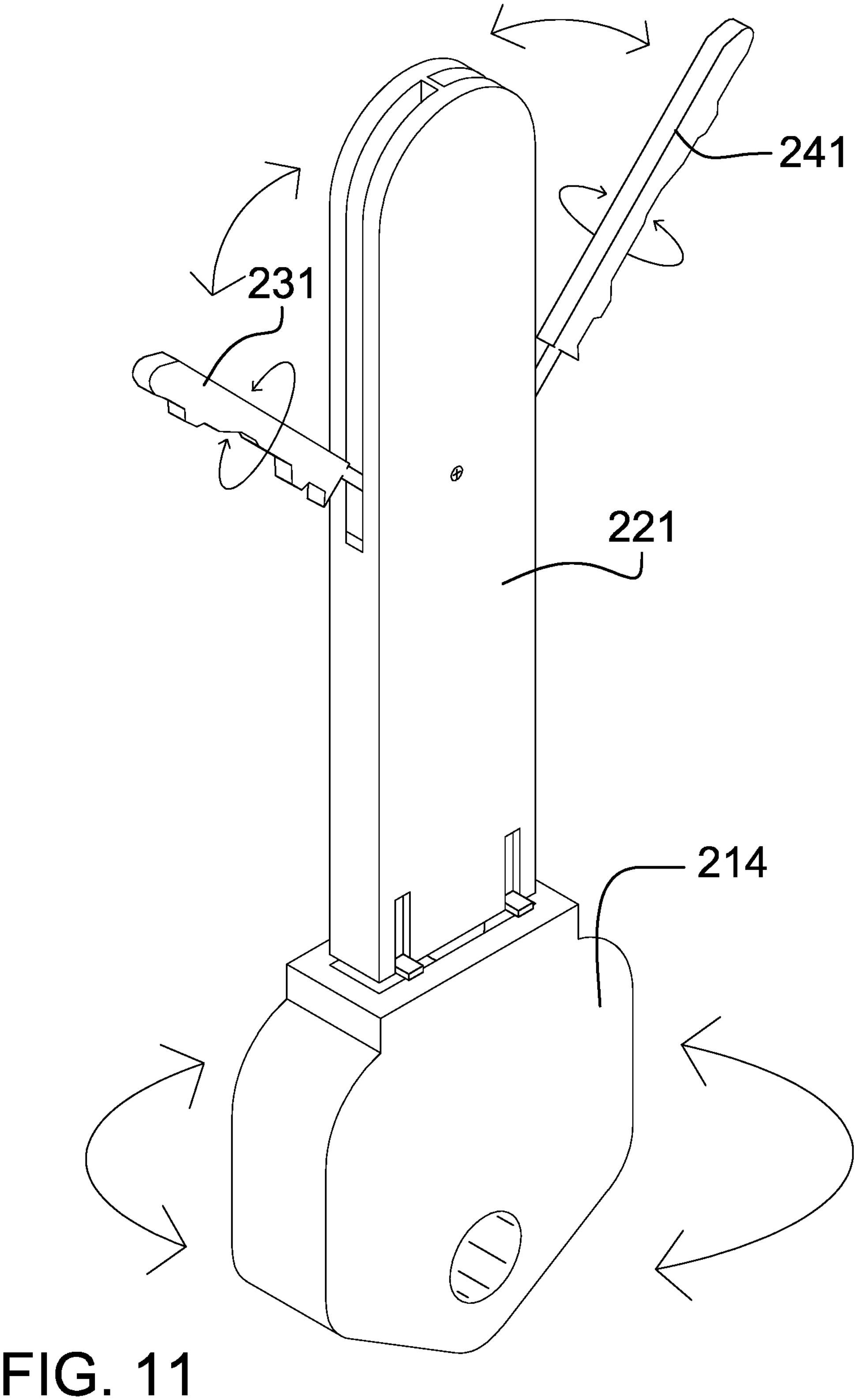
FIG. 11 is an in-use view of an embodiment of the disclosure.
Figure 12:
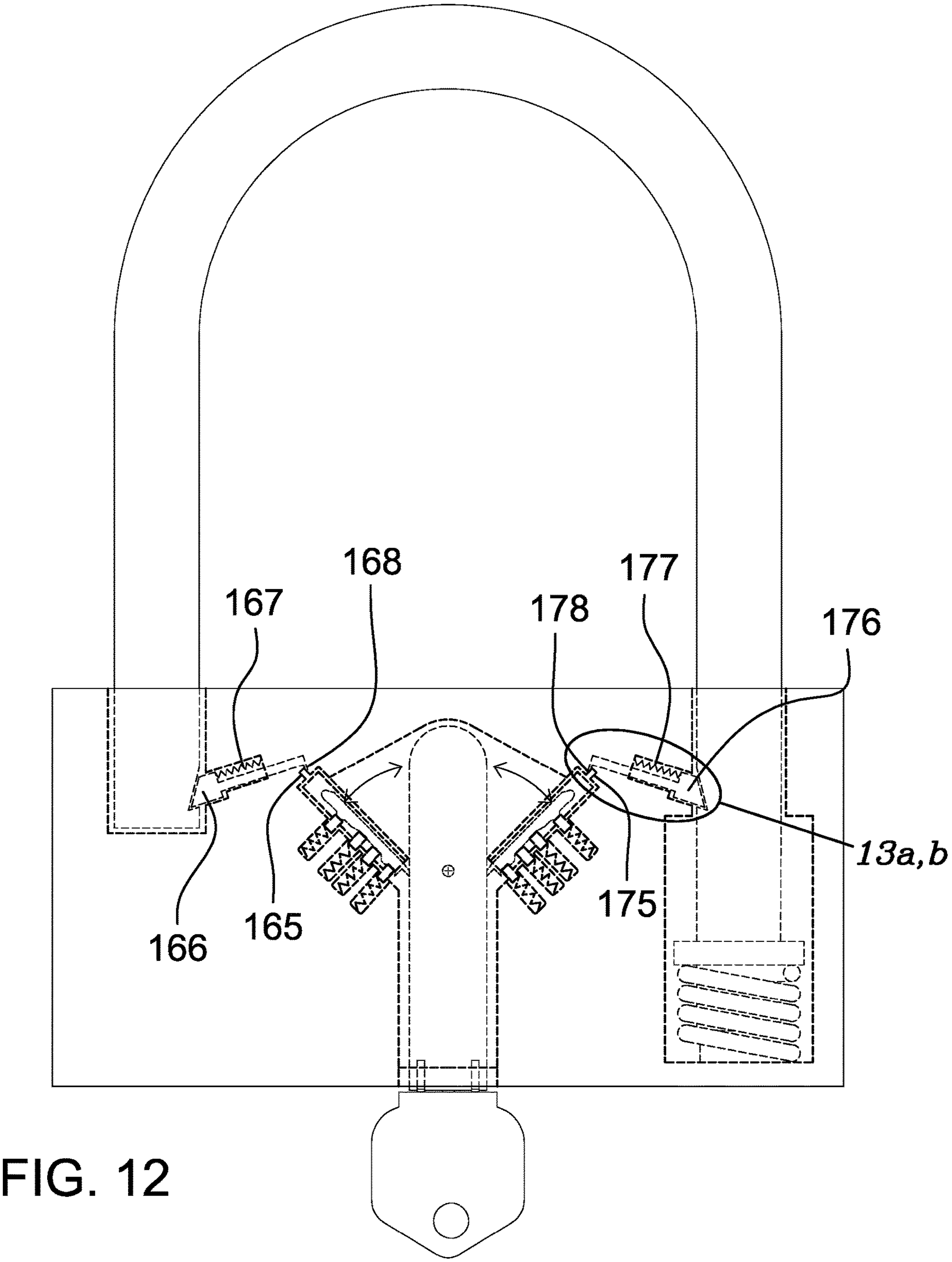
FIG. 12 is a front view of an embodiment of the disclosure.
Figure 13A:
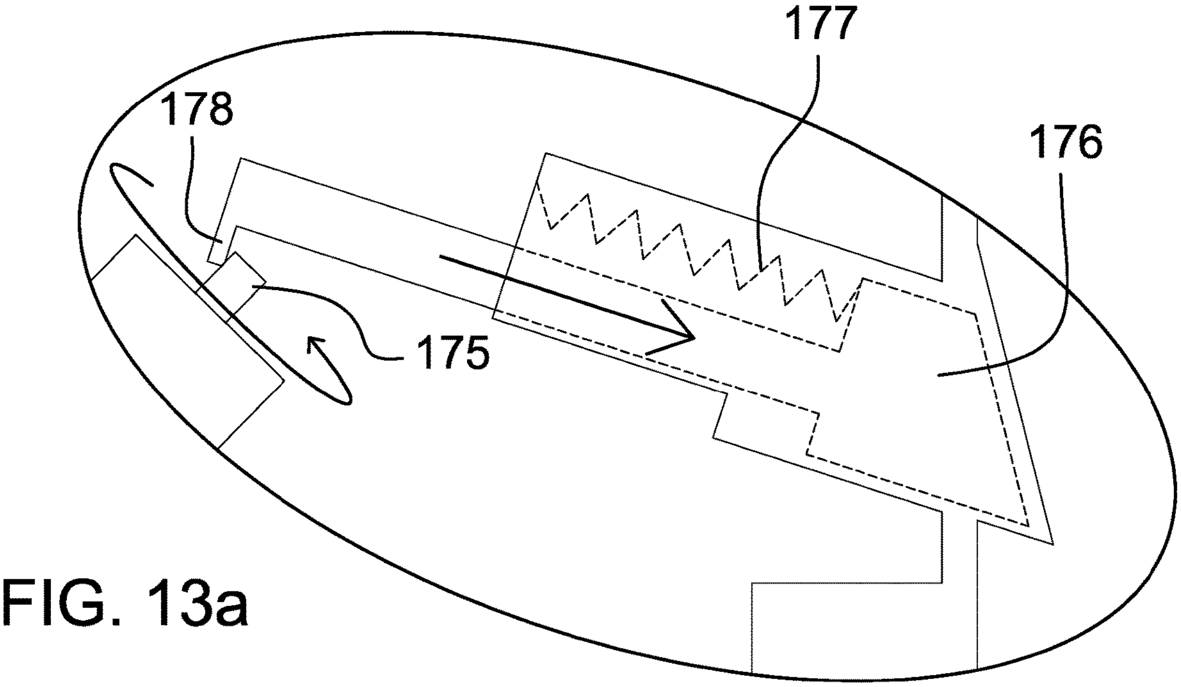
FIG. 13*a* is a detail view of an embodiment of the disclosure.
Figure 13B:
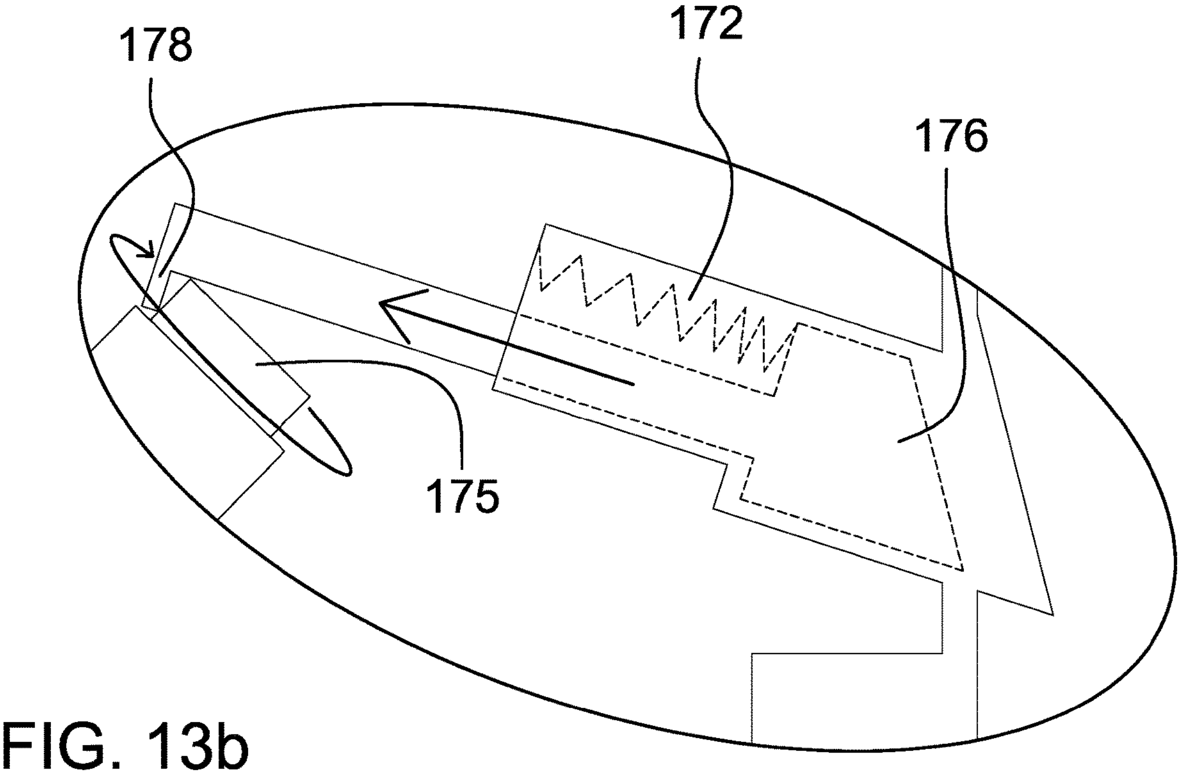
FIG. 13*b* is a detail view of an embodiment of the disclosure.

Detailed reference will now be made to one or more potential embodiments of the disclosure, which are illustrated in FIGS. 1 through 13.

The lock with key having expanding arm elements 100 (hereinafter invention) is a lock. The invention 100 comprises a body structure 101 and a key structure 201. The key structure 201 inserts into the body structure 101. The key structure 201 rotates within the body structure 101 to release the locking elements of the invention 100. The key structure 201 comprises a plurality of rotating blade structures. Each of the plurality of rotating blade structures interacts with an independent lock mechanism selected from a plurality of lock mechanisms 113 contained in the body structure 101. The rotation of each rotating blade structure within its associated independent lock mechanism releases the locking elements of the invention 100.

The body structure 101 is a mechanical structure. The body structure 101 forms the structure that performs the locking functions of the invention 100. The body structure 101 performs the locking function of the invention 100 by binding a first object to a second object. The body structure 101 comprises a block structure 111, a shackle 112, and a plurality of lock mechanisms 113. The shackle 112 inserts into and out of the block structure 111. The block structure 111 contains the plurality of lock mechanisms 113.

The block structure 111 is a mechanical structure. The block structure 111 is a rigid structure. The block structure 111 forms a housing. The block structure 111 contains the plurality of lock mechanisms 113. The block structure 111 comprises a first shackle 112 mortise 131, a second shackle 112 mortise 132, and a key cavity 133.

The first shackle 112 mortise 131 is a negative space that is formed in the block structure 111 of the body structure 101. The first shackle 112 mortise 131 is sized to receive the first shackle 112 tenon 141 when the shackle 112 inserts into the block structure 111.

The second shackle 112 mortise 132 is a negative space that is formed in the block structure 111 of the body structure 101. The second shackle 112 mortise 132 is sized to receive the second shackle 112 tenon 142 when the shackle 112 inserts into the block structure 111.

The key cavity 133 is a negative space that is formed in the block structure 111. The key cavity 133 forms the space that the key structure 201 inserts into. The key cavity 133 further forms the space that allows the key structure 201 to interact with the plurality of lock mechanisms 113 to release the lock that binds the first object to the second object. The key cavity 133 further comprises a key slot 134, a master cavity 135, and an expansion cavity 136.

The key slot 134 is an aperture formed through the exterior surface of the block structure 111. The key slot 134 forms a port that allows the key structure 201 to insert into the plurality of lock mechanisms 113. The key slot 134 is sized such that the master blade 221 structure 211 will insert into the key slot 134 when both the first blade 233 structure 231 and the second blade 243 structure 241 are contained within the master blade 221. The master blade 221 structure 211, the master blade 221, and the first blade 233 structure 231, and the second blade 243 structure 241 are described elsewhere in this disclosure.

The master cavity 135 is the space of the key cavity 133 through which the master blade 221 structure 211 inserts to reach the expansion cavity 136.

The expansion cavity 136 is the space within the key cavity 133 where the plurality of lock mechanisms 113 are located. The expansion cavity 136 further provides the space that allows the first blade 233 structure 231 and the second blade 243 structure 241 to rotate away from the master blade 221 such that the first blade 233 structure 231, and the second blade 243 structure 241 can interact with the plurality of lock mechanisms 113.

The shackle 112 removably inserts into the block structure 111 to bind the first object to the second object. The shackle 112 is removed from the block structure 111 to release the first object from the second object. The shackle 112 is a rigid structure. The shackle 112 is a u-shaped structure. The shackle 112 has a non-Euclidean prism shape. The shackle 112 forms the mechanical structure that binds the first object to the second object. The shackle 112 inserts into the block structure 111. The shackle 112 further comprises a first shackle 112 tenon 141, a second shackle 112 tenon 142, a first shackle 112 notch 151, a second shackle 112 notch 152, and a shackle 112 spring 153.

The first shackle 112 tenon 141 is a congruent end of the non-Euclidean prism structure of the shackle 112. The first shackle 112 tenon 141 is the congruent end of the shackle 112 that inserts into the first shackle 112 mortise 131.

The second shackle 112 tenon 142 is a congruent end of the non-Euclidean prism structure of the shackle 112. The second shackle 112 tenon 142 is the congruent end of the shackle 112 that inserts into the second shackle 112 mortise 132. The second shackle 112 tenon 142 of the shackle 112 always remains in the second shackle 112 mortise 132. The second shackle 112 tenon 142 moves within the second shackle 112 mortise 132.

The first shackle 112 notch 151 is a negative space that is formed in the lateral face of the non-Euclidean prism structure of the shackle 112. The first shackle 112 notch 151 is positioned proximal to the first shackle 112 tenon 141. The first shackle 112 notch 151 is positioned such that the first latch mechanism 166 of the first lock mechanism 161 inserts into the first shackle 112 notch 151 to lock the shackle 112 into position. The first lock mechanism 161 removes the first latch mechanism 166 from the first shackle 112 notch 151 to release the lock on the shackle 112.

The second shackle 112 notch 152 is a negative space that is formed in the lateral face of the non-Euclidean prism structure of the shackle 112. The second shackle 112 notch 152 is positioned proximal to the second shackle 112 tenon 142. The second shackle 112 notch 152 is positioned such that the second latch mechanism 176 of the second lock mechanism 171 inserts into the second shackle 112 notch 152 to lock the shackle 112 into position. The second lock mechanism 171 removes the second latch mechanism 176 from the second shackle 112 notch 152 to release the lock on the shackle 112.

The shackle 112 spring 153 is a compression spring. The shackle 112 spring 153 mounts in the second shackle 112 tenon 142 of the block structure 111. The shackle 112 deforms the shackle 112 spring 153 when the shackle 112 moves into the locked position. The shackle 112 spring 153 pushes the shackle 112 of the block structure 111 when the lock on the plurality of lock mechanisms 113 releases the lock on the shackle 112.

The plurality of lock mechanisms 113 lock the shackle 112 into position such that the shackle 112 binds the first object to the second object. The key structure 201 releases the plurality of lock mechanisms 113 such that the plurality of lock mechanisms 113 release the shackle 112 such that the shackle 112 releases the first object from the second object. Each of the plurality of lock mechanisms 113 lock the shackle 112 into position when the shackle 112 inserts into the block structure 111. Each of the plurality of lock mechanisms 113 release the lock on the shackle 112 when the key structure 201 is rotated within the block structure 111 of the body structure 101. The plurality of lock mechanisms 113 further comprise a first lock mechanism 161 and a second lock mechanism 171.

The first lock mechanism 161 is a mechanical structure. The first lock mechanism 161 locks the shackle 112 into position such that the shackle 112 binds the first object to the second object. The first lock mechanism 161 mounts in the expansion cavity 136 such that the first blade 233 structure 231 interacts with the first lock mechanism 161 to release the lock on the shackle 112. The first lock mechanism 161 further comprises a first plug 162, a first tumbler set 163, and a first mechanical linkage 164.

The first plug 162 is a c-channel that mounts in the expansion cavity 136 such that the first plug 162 will rotate within the expansion cavity 136. The first plug 162 is sized and positioned such that the first blade 233 structure 231 will insert into the open lateral face of the first plug 162 when the first lock mechanism 161 locks the shackle 112 into position. The key structure 201 will rotate the first blade 233 structure 231 while the first blade 233 structure 231 is contained within the first plug 162 such that the rotation of the first blade 233 structure 231 will rotate the first plug 162. The rotation of the first blade 233 structure 231 by the key structure 201 while the first blade 233 structure 231 is contained within the first plug 162 is described elsewhere in this disclosure. The position of the first blade 233 structure 231 within the first plug 162 is selected such that the first blade 233 structure 231 will appropriately interact with the first tumbler set 163 while the first blade 233 structure 231 is inserted into the first plug 162.

The first plug 162 further comprises a first cam tab 165. The first cam tab 165 is a mechanical structure that attaches to the first plug 162 such that the rotation of the first plug 162 will rotate the first cam tab 165.

The first tumbler set 163 is a set of lock tumblers that lock the first plug 162 into a fixed position within the expansion cavity 136 when the shackle 112 is in the locked position. The first tumbler set 163 is designed to interact with the first blade 233 structure 231 such that the rotation of the first tumbler set 163 will not inhibit the rotation of the first plug 162 within the expansion cavity 136 when the appropriately keyed structure is used as the first blade 233 structure 231.

The first mechanical linkage 164 is a mechanical structure. The first mechanical linkage 164 forms a linkage between the first plug 162 and the first shackle 112 notch 151 of the shackle 112 such that the rotation of the first blade 233 structure 231 will rotate the first plug 162 such that the lock of the first lock mechanism 161 on the first shackle 112 notch 151 is released. The first mechanical linkage 164 further comprises a first latch mechanism 166, a first compression spring 167, and a first plug tang 168.

The first plug tang 168 is an extension structure that mechanically attaches the first cam tab 165 to the first latch mechanism 166. The first plug tang 168 attaches to the first cam tab 165 such that the rotation of the first plug 162 pulls the first latch mechanism 166 away from the first shackle 112 notch 151 to release the lock on the shackle 112.

The first latch mechanism 166 is a mechanical structure that is geometrically similar to the first shackle 112 notch 151. The first latch mechanism 166 and the first shackle 112 notch 151 are formed such that the insertion of the first latch mechanism 166 into the first shackle 112 notch 151 will lock the shackle 112 into a fixed position.

The first compression spring 167 is an energy storage device. The rotation of the first plug 162 deforms the first compression spring 167 as the first plug 162 simultaneously pulls the first latch mechanism 166 out of the first shackle 112 notch 151. The first compression spring 167 provides the motive forces that assist in reinsertion of the first latch mechanism 166 into the first shackle 112 notch 151 the next time the shackle 112 is locked into position.

The second lock mechanism 171 is a mechanical structure. The second lock mechanism 171 locks the shackle 112 into position such that the shackle 112 binds the first object to the second object. The second lock mechanism 171 mounts in the expansion cavity 136 such that the second blade 243 structure 241 interacts with the second lock mechanism 171 to release the lock on the shackle 112. The second lock mechanism 171 further comprises a second plug 172, a second tumbler set 173, and a second mechanical linkage 174.

The second plug 172 is a c-channel that mounts in the expansion cavity 136 such that the second plug 172 will rotate within the expansion cavity 136. The second plug 172 is sized and positioned such that the second blade 243 structure 241 will insert into the open lateral face of the second plug 172 when the second lock mechanism 171 locks the shackle 112 into position. The key structure 201 will rotate the second blade 243 structure 241 while the second blade 243 structure 241 is contained within the second plug 172 such that the rotation of the first blade 233 structure 231 will rotate the second plug 172. The rotation of the second blade 243 structure 241 by the key structure 201 while the second blade 243 structure 241 is contained within the second plug 172 is described elsewhere in this disclosure. The position of the second blade 243 structure 241 within the second plug 172 is selected such that the second blade 243 structure 241 will appropriately interact with the second tumbler set 173 while the second blade 243 structure 241 is inserted into the second plug 172.

The second plug 172 further comprises a second cam tab 175. The second cam tab 175 is a mechanical structure that attaches to the second plug 172 such that the rotation of the second plug 172 will rotate the second cam tab 175.

The second tumbler set 173 is a set of lock tumblers that lock the second plug 172 into a fixed position within the expansion cavity 136 when the shackle 112 is in the locked position. The second tumbler set 173 is designed to interact with the second blade 243 structure 241 such that the rotation of the second tumbler set 173 will not inhibit the rotation of the second plug 172 within the expansion cavity 136 when the appropriately keyed structure is used as the second blade 243 structure 241.

The second mechanical linkage 174 is a mechanical structure. The second mechanical linkage 174 forms a linkage between the second plug 172 and the second shackle 112 notch 152 of the shackle 112 such that the rotation of the second blade 243 structure 241 will rotate the second plug 172 such that the lock of the second lock mechanism 171 on the second shackle 112 notch 152 is released. The second mechanical linkage 174 further comprises a second latch mechanism 176, a second compression spring 177, and a second plug tang 178.

The second plug tang 178 is an extension structure that mechanically attaches the second cam tab 175 to the second latch mechanism 176. The second plug tang 178 attaches to the second cam tab 175 such that the rotation of the second plug 172 pulls the second latch mechanism 176 away from the second shackle 112 notch 152 to release the lock on the shackle 112.

The second latch mechanism 176 is a mechanical structure that is geometrically similar to the second shackle 112 notch 152. The second latch mechanism 176 and the second shackle 112 notch 152 are formed such that the insertion of the second latch mechanism 176 into the second shackle 112 notch 152 will lock the shackle 112 into a fixed position.

The second compression spring 177 is an energy storage device. The rotation of the second plug 172 deforms the second compression spring 177 as the second plug 172 simultaneously pulls the second latch mechanism 176 out of the second shackle 112 notch 152. The second compression spring 177 provides the motive forces that assist in reinsertion of the second latch mechanism 176 into the second shackle 112 notch 152 the next time the shackle 112 is locked into position.

The key structure 201 is a mechanical structure. The key structure 201 inserts into and out of the body structure 101. The key structure 201 operates the plurality of lock mechanisms 113 of the body structure 101 to release the lock that binds the first object to the second object. The key structure 201 comprises a master blade 221 structure 211, a retaining structure 212, a master shaft 213, a handle 214, and a bevel gear structure 215. The master blade 221 structure 211 contains the retaining structure 212 and the bevel gear structure 215. The master shaft 213 attaches the master blade 221 structure 211 to the handle 214. The master shaft 213 attaches to the bevel gear structure 215 such that the rotation of the handle 214 rotates the bevel gear structure 215.

The master blade 221 structure 211 is a semi-enclosed disk shaped structure. The master blade 221 structure 211 is a rigid structure. The master blade 221 structure 211 forms a housing that contains the retaining structure 212, the master shaft 213, and the bevel gear structure 215. The housing formed by the master blade 221 structure 211 further contains the first blade 233 structure 231 and the second blade 243 structure 241. The master blade 221 structure 211 further comprises a master blade 221, a first blade 233 structure 231, and a second blade 243 structure 241.

The master blade 221 forms the exterior structure of the master blade 221 structure 211. The master blade 221 is a prism shaped structure. The master blade 221 is a disk shaped structure. The master blade 221 has a semi-enclosed disk shape. The master blade 221 is a hollow structure. The first blade 233 structure 231 attaches to the master blade 221 such that the first blade 233 structure 231 rotates into and out of the master blade 221. The second blade 243 structure 241 attaches to the master blade 221 such that the second blade 243 structure 241 rotates into and out of the master blade 221.

The first blade 233 structure 231 is a mechanical structure. The first blade 233 structure 231 is a prism shaped structure. The first blade 233 structure 231 has a disk shape. The first blade 233 structure 231 inserts into the first plug 162 of the first lock mechanism 161. The first blade 233 structure 231 interacts with the first tumbler set 163 of the first lock mechanism 161 when the first blade 233 structure 231 is inserted in the first plug 162. The interaction between the first blade 233 structure 231 and the first tumbler set 163 allows the first blade 233 structure 231 to rotate the first plug 162 through the first tumbler set 163 of the first lock mechanism 161. The first blade 233 structure 231 physically attaches to the first spherical bevel gear 261 of the bevel gear structure 215 such that the rotation of the first spherical bevel gear 261 rotates the first blade 233 structure 231. The rotation of the first spherical bevel gear 261 provides the motive forces required by the first blade 233 structure 231 to rotate the first plug 162 of the first lock mechanism 161.

The first blade 233 structure 231 further comprises a first extension shaft 232, a first blade 233, and a first plurality of teeth 234.

The first extension shaft 232 is an extension structure. The first extension shaft 232 is a rigid structure. The first extension shaft 232 mechanically attaches the first spherical bevel gear 261 to the first blade 233 such that the rotation of the first extension shaft 232 transfers the rotation of the first spherical bevel gear 261 to the first blade 233.

The first blade 233 is a prism shaped structure. The first blade 233 has a disk shape. The first blade 233 is sized such that the first blade 233 inserts into the first plug 162 of the first lock mechanism 161. The first blade 233 attaches to the first extension shaft 232 such that the rotation of the first extension shaft 232 simultaneously rotates the first blade 233 and the first plug 162 within the key cavity 133.

The first plurality of teeth 234 are an irregular surface that is formed on the lateral face of the disk structure of the first blade 233. The first plurality of teeth 234 are positioned on the first blade 233 such that the first plurality of teeth 234 will interact with the first tumbler set 163 of the first lock mechanism 161 when the first blade 233 inserts into the first plug 162.

The second blade 243 structure 241 is a mechanical structure. The second blade 243 structure 241 is a prism shaped structure. The second blade 243 structure 241 has a disk shape. The second blade 243 structure 241 inserts into the second plug 172 of the second lock mechanism 171. The second blade 243 structure 241 interacts with the second tumbler set 173 of the second lock mechanism 171 when the second blade 243 structure 241 is inserted in the second plug 172. The interaction between the second blade 243 structure 241 and the second tumbler set 173 allows the second blade 243 structure 241 to rotate the second plug 172 through the second tumbler set 173 of the second lock mechanism 171. The second blade 243 structure 241 physically attaches to the second spherical bevel gear 262 of the bevel gear structure 215 such that the rotation of the second spherical bevel gear 262 rotates the second blade 243 structure 241. The rotation of the second spherical bevel gear 262 provides the motive forces required by the second blade 243 structure 241 to rotate the second plug 172 of the second lock mechanism 171.

The second blade 243 structure 241 further comprises a second extension shaft 242, a second blade 243, and a second plurality of teeth 244.

The second extension shaft 242 is an extension structure. The second extension shaft 242 is a rigid structure. The second extension shaft 242 mechanically attaches the second spherical bevel gear 262 to the second blade 243 such that the rotation of the second extension shaft 242 transfers the rotation of the second spherical bevel gear 262 to the second blade 243.

The second blade 243 is a prism shaped structure. The second blade 243 has a disk shape. The second blade 243 is sized such that the second blade 243 inserts into the second plug 172 of the second lock mechanism 171. The second blade 243 attaches to the second extension shaft 242 such that the rotation of the second extension shaft 242 simultaneously rotates the second blade 243 and the second plug 172 within the key cavity 133.

The second plurality of teeth 244 are an irregular surface that is formed on the lateral face of the disk structure of the second blade 243. The second plurality of teeth 244 are positioned on the second blade 243 such that the second plurality of teeth 244 will interact with the second tumbler set 173 of the second lock mechanism 171 when the second blade 243 inserts into the second plug 172.

The retaining structure 212 is a mechanical structure. The retaining structure 212 is a rotating structure. The retaining structure 212 rotates the first blade 233 structure 231 and the second blade 243 structure 241 into and out of the master blade 221 structure 211. The retaining structure 212 mechanically releases the first blade 233 structure 231 and the second blade 243 structure 241 from the master blade 221 structure 211 such that the first blade 233 structure 231 and the second blade 243 structure 241 rotate through the expansion cavity 136 into the first plug 162 and the second plug 172 respectively. The retaining structure 212 returns the first blade 233 structure 231 and the second blade 243 structure 241 into the master blade 221 structure 211 when the key structure 201 is removed from the body structure 101. The retaining structure 212 locks the first blade 233 structure 231 and the second blade 243 structure 241 into position within the master blade 221 structure 211 when the key structure 201 is removed from the body structure 101.

The master shaft 213 is a prism shaped structure. The master shaft 213 is a rigid structure. The master shaft 213 attaches the handle 214 to the bevel gear structure 215 such that the rotation of the handle 214 generates the motive forces necessary to rotate the bevel gear structure 215.

The handle 214 is a grip. The handle 214 is used to manipulate the key structure 201. The handle 214 attaches to a congruent end of the master shaft 213 such that the rotation of the handle 214 rotates the master shaft 213. The handle 214 attaches to a congruent end of the master shaft 213 such that the handle 214 rotates freely relative to the master blade 221 structure 211.

The bevel gear structure 215 is a gear structure. The bevel gear structure 215 is a rotating structure. The bevel gear structure 215 attaches to a congruent end of the prism structure of the master shaft 213. The rotation of the master shaft 213 provides the motive forces that rotate the bevel gear structure 215. The bevel gear structure 215 attaches to the first blade 233 structure 231 such that the rotation of the bevel gear structure 215 rotates the first blade 233 structure 231 when the first blade 233 structure 231 is inserted in the first plug 162. The bevel gear structure 215 attaches to the second blade 243 structure 241 such that the rotation of the bevel gear structure 215 rotates the second blade 243 structure 241 when the second blade 243 structure 241 is inserted in the second plug 172.

The bevel gear structure 215 comprises a first bevel gear 251, a second bevel gear 252, a third bevel gear 253, a first spherical bevel gear 261, and a second spherical bevel gear 262.

The first bevel gear 251 is a bevel gear. The bevel gear is defined elsewhere in this disclosure. The first bevel gear 251 forms a mechanical linkage between the third bevel gear 253 and the first spherical bevel gear 261 such that the rotation of the third bevel gear 253 will rotate the first spherical bevel gear 261.

The second bevel gear 252 is a bevel gear. The bevel gear is defined elsewhere in this disclosure. The second bevel gear 252 forms a mechanical linkage between the third bevel gear 253 and the second spherical bevel gear 262 such that the rotation of the third bevel gear 253 will rotate the second spherical bevel gear 262.

The third bevel gear 253 is a bevel gear. The bevel gear is defined elsewhere in this disclosure. The third bevel gear 253 attaches to a congruent end of the master shaft 213 such that the rotation of the master shaft 213 rotates the third bevel gear 253. The rotation of the third bevel gear 253 rotates the first bevel gear 251. The rotation of the third bevel gear 253 rotates the second bevel gear 252.

The first spherical bevel gear 261 is a spherically shaped bevel gear. The first spherical bevel gear 261 forms a mechanical linkage between the first bevel gear 251 and the first extension shaft 232 such that the rotation of the first bevel gear 251 will rotate the first extension shaft 232.

The second spherical bevel gear 262 is a spherically shaped bevel gear. The second spherical bevel gear 262 forms a mechanical linkage between the second bevel gear 252 and the second extension shaft 242 such that the rotation of the second bevel gear 252 will rotate the second extension shaft 242.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Bevel Gear: As used in this disclosure, a bevel gear is a gear with teeth that are formed on a conical surface that is used to transmit motion between non-parallel or intersecting shafts.

Blade: As used in this disclosure, a blade is a term that is used to describe: 1) a wide and flat portion of a structure; or, 2) the cutting edge of a tool.

C-Channel: As used in this disclosure, the C-channel is a load bearing structure, such as a beam, that is formed in a U-shape. The C-channel forms a prism shape with a hollow interior and an open lateral face that forms a shape characteristic of the letter C when viewed from the congruent ends. The open space of the C-channel is often used as a track.

Cant: As used in this disclosure, a cant is an angular deviation from one or more reference lines (or planes) such as a vertical line (or plane) or a horizontal line (or plane).

Cavity: As used in this disclosure, a cavity is an empty space or negative space that is formed within an object.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned.

When the center axes of two cylinder, prism or pyramidal structures do not share the same line they are said to be offset.

Center of Rotation: As used in this disclosure, the center of rotation is the point of a rotating plane that does not move with the rotation of the plane. A line within a rotating three-dimensional object that does not move with the rotation of the object is also referred to as an axis of rotation.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Compression Spring: As used in this disclosure, a compression spring is a spring that resists forces attempting to compress the spring in the direction of the center axis of the spring. The compression spring will return to its relaxed shape when the compressive force is removed.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Form Factor: As used in this disclosure, the term form factor refers to the size and shape of an object.

Gear: As used in this disclosure, a gear is a toothed wheel, cylinder, or other toothed mechanical element that is used to transmit motion, a change of speed, or a change of direction to a second toothed wheel, cylinder, or other toothed mechanical element.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Grip: As used in this disclosure, a grip is an accommodation formed on or within an object that allows the object to be grasped or manipulated by a hand.

Handle: As used in this disclosure, a handle is an object by which a tool, object, or door is held or manipulated with the hand.

Interior: As used in this disclosure, the interior is used as a relational term that implies that an object is contained within the boundary of a structure or a space.

Latch: As used in this disclosure, a latch is a fastening or locking mechanism. The use of the term latch does not necessarily but often implies the insertion of an object into a notch or cavity.

Lock: As used in this disclosure, a lock is a fastening device that fixes the position of a first object relative to a second object such that the first object and the second object are subsequently releasable.

Major and Minor Axes: As used in this disclosure, the major and minor axes refer to a pair of perpendicular axes that are defined within a structure. The length of the major axis is always greater than or equal to the length of the minor axis. The major axis is always the longest diameter of the perimetrical boundary of the structure. The major and minor axes intersect at the center of the perimetrical boundary of the structure. The major axis is always parallel to the longest edge of a rectangular structure.

Mechanical Linkage: As used in this disclosure, a mechanical linkage is an interconnected arrangement of components that are used to manage the transfer of a movement or a force. A mechanical linkage is often referred to as a linkage.

Mortise: As used in this disclosure, a mortise is a prism-shaped negative space formed in an object that is designed to receive a geometrically similar object referred to as a tenon.

Negative Space: As used in this disclosure, negative space is a method of defining an object through the use of open or empty space as the definition of the object itself, or, through the use of open or empty space to describe the boundaries of an object.

Non-Euclidean Plane: As used in this disclosure, a non-Euclidean plane (or non-Euclidean surface) is a geometric plane that is formed with a curvature such that: a) two parallel lines will intersect somewhere in the planar surface; or, b) the span of the perpendicular distance between two parallel lines will vary as a function of the position of the plane; or, c) the minimum distance between two points on the non-Euclidean plane as measured along the non-Euclidean plane is greater than the absolute minimum distance between the same two points. In many geometries, the statements (a) and (b) can be considered identical statements. A non-Euclidean plane is said to form a roughly Euclidean surface (or plane) when the span of the minimum distance between two points on the non-Euclidean plane as measured along the non-Euclidean plane is less than or equal to 1.10 times the absolute minimum distance between the same two points.

Non-Euclidean Prism: As used in this disclosure, a non-Euclidean prism is a prism structure wherein the center axis of the prism lies on a non-Euclidean plane or is otherwise formed with a curvature.

Notch: As used in this disclosure, a notch is: 1) an indentation formed in an edge; or 2) a cavity or aperture formed within a surface.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of the prism structure of the pan and/or a portion of the closed lateral faces of the pan are open.

Perimeter: As used in this disclosure, a perimeter is one or more curved or straight lines that bounds an enclosed area on a plane or surface. The perimeter of a circle is commonly referred to as a circumference.

Perimetrical Boundary: As used in this disclosure, a perimetrical boundary is a hypothetical rectangular block that contains an object. Specifically, the rectangular block selected to be the perimetrical boundary is the rectangular block with the minimum volume that fully contains the object. In a two-dimensional structure, the perimetrical boundary is the rectangle with the minimum surface area.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Reach: As used in this disclosure, reach refers to a span of distance between any two objects.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Rotation: As used in this disclosure, rotation refers to the cyclic movement of an object around a fixed point or fixed axis. The verb of rotation is to rotate.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Slot: As used in this disclosure, a slot is a prism-shaped negative space formed as a groove or aperture that is formed in or through an object.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Such As: As used in this disclosure, the term “such as” is a conjunction that relates a first phrase to a subsequent phrase. The term “such as” is used to introduce representative examples of structures that meet the requirements of the first phrase. As a first example of the use of the term “such as,” the phrase: “the first textile attaches to the second textile using a fastener such as a hook and loop fastener” is taken to mean that a hook and loop fastener is suitable to use as the fastener but is not meant to exclude the use of a zipper or a sewn seam. As a second example of the use of the term “such as,” the phrase: “the chemical substance is a halogen such as chlorine or bromine” is taken to mean that either chlorine or bromine are suitable for use as the halogen but is not meant to exclude the use of fluorine or iodine.

Such That: As used in this disclosure, the term “such that” is a conjunction that relates a first phrase to a subsequent phrase. The term “such that” is used to place a further limitation or requirement to the first phrase. As a first example of the use of the term “such that,” the phrase: “the door attaches to the wall such that the door rotates relative to the wall” requires that the attachment of the door allows for this rotation. As a second example of the use of the term “such that,” the phrase: “the chemical substance is selected such that the chemical substance is soluble in water” requires that the selected chemical substance is soluble in water. As a third example of the use of the term “such that,” the phrase: “the lamp circuit is constructed such that the lamp circuit illuminates when the lamp circuit detects darkness” requires that the lamp circuit: a) detect the darkness; and, b) generate the illumination when the darkness is detected.

Tenon: As used in this disclosure, a tenon is a prism-shaped structure that fits into a mortise such that the tenon is secured to the mortise. The tenon is geometrically similar to the mortise.

U-Shaped Structure: As used in this disclosure, a U-shaped structure refers to a three sided structure comprising a crossbeam, a first arm, and a second arm. In a U-shaped structure, the first arm and the second arm project away from the crossbeam: 1) in the same direction; 2) at a roughly perpendicular angle to the crossbeam, and, 3) the span of length of the first arm roughly equals the span of length of the second arm. An illiterate U-shaped structure refers to a U-shaped structure wherein the span of the length of the first arm differs from the span of the length of the second arm by more than 10 percent.

Universal Joint: As used in this disclosure, a universal joint is a method of joining a first shaft to a second shaft such that the center axis of the first shaft is offset from the center axis of the second shaft. The offset angle is adjustable. When a universal joint is formed with a locking mechanism, a universal joint can further be used to lock the offset angle, often referred to as a cant, between the first shaft and the second shaft into a fixed position. Universal joints are often used to transfer rotation from the first shaft to rotate the second shaft.

With respect to the above description, it is to be realized that the optimum dimensional relationship for the various components of the invention described above and in FIGS. 1 through 13 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A lock with key having expanding arm elements comprising a body structure and a key structure;

wherein the key structure inserts into the body structure;

wherein the key structure comprises a plurality of rotating blade structures;

wherein each of the plurality of rotating blade structures interact with an independent lock mechanism selected from a plurality of lock mechanisms contained in the body structure;

wherein the rotation of each rotating blade structure within its associated independent lock mechanism releases the locking elements of the lock with key having expanding arm elements;

wherein the body structure forms the structure that performs the locking functions of the lock with key having expanding arm elements;

wherein the key structure inserts into and out of the body structure;

wherein the key structure operates the plurality of lock mechanisms of the body structure to release the lock that binds the first object to the second object;

wherein the key structure comprises a master blade structure, a retaining structure, a master shaft, a handle, and a bevel gear structure.

2. The lock with key having expanding arm elements according to claim 1 wherein the body structure is a mechanical structure.

3. The lock with key having expanding arm elements according to claim 2 wherein the key structure is a mechanical structure.

4. The lock with key having expanding arm elements according to claim 3 wherein the body structure comprises a block structure, a shackle, and a plurality of lock mechanisms;

wherein the shackle inserts into and out of the block structure;

wherein the block structure contains the plurality of lock mechanisms.

5. The lock with key having expanding arm elements according to claim 4 wherein the master blade structure contains the retaining structure and the bevel gear structure;

wherein the master shaft attaches the master blade structure to the handle;

wherein the master shaft attaches to the bevel gear structure such that the rotation of the handle rotates the bevel gear structure.

6. The lock with key having expanding arm elements according to claim 5 wherein the block structure is a mechanical structure;

wherein the block structure is a rigid structure;

wherein the block structure forms a housing;

wherein the block structure contains the plurality of lock mechanisms.

7. The lock with key having expanding arm elements according to claim 6 wherein the shackle removably inserts into the block structure to bind the first object to the second object;

wherein the shackle is removed from the block structure to release the first object from the second object;

wherein the shackle is a rigid structure;

wherein the shackle is a u-shaped structure;

wherein the shackle has a non-Euclidean shape;

wherein the shackle forms the mechanical structure that binds the first object to the second object;

wherein the shackle inserts into the block structure.

8. The lock with key having expanding arm elements according to claim 7 wherein the plurality of lock mechanisms lock the shackle into position such that the shackle binds the first object to the second object;

wherein the key structure releases the plurality of lock mechanisms such that the plurality of lock mechanisms release the shackle such that the shackle releases the first object from the second object;

wherein each of the plurality of lock mechanisms lock the shackle into position when the shackle inserts into the block structure;

wherein each of the plurality of lock mechanisms release the lock on the shackle when the key structure is rotated within the block structure of the body structure.

9. The lock with key having expanding arm elements according to claim 8 wherein the master blade structure is a semi-enclosed disk shaped structure;

wherein the master blade structure is a rigid structure;

wherein the master blade structure forms a housing that contains the retaining structure, the master shaft, and the bevel gear structure;

wherein the housing formed by the master blade structure further contains the first blade structure and the second blade structure.

10. The lock with key having expanding arm elements according to claim 9 wherein the retaining structure is a mechanical structure;

wherein the retaining structure is a rotating structure;

wherein the master shaft is a rigid structure;

wherein the master shaft attaches the handle to the bevel gear structure such that the rotation of the handle generates the motive forces necessary to rotate the bevel gear structure;

wherein the handle is a grip;

wherein the handle is used to manipulate the key structure;

wherein the handle attaches to a congruent end of the master shaft such that the rotation of the handle rotates the master shaft;

wherein the handle attaches to a congruent end of the master shaft such that the handle rotates freely relative to the master blade structure.

11. The lock with key having expanding arm elements according to claim 10 wherein the bevel gear structure is a gear structure;

wherein the bevel gear structure is a rotating structure;

wherein the bevel gear structure attaches to a congruent end of the master shaft;

wherein the rotation of the master shaft provides the motive forces that rotate the bevel gear structure;

wherein the bevel gear structure attaches to the first blade structure such that the rotation of the bevel gear structure rotates the first blade structure when the first blade structure is inserted in the first plug;

wherein the bevel gear structure attaches to the second blade structure such that the rotation of the bevel gear structure rotates the second blade structure when the second blade structure is inserted in the second plug.

12. The lock with key having expanding arm elements according to claim 11 wherein the block structure comprises a first shackle mortise, a second shackle mortise, and a key cavity;

wherein the first shackle mortise is a negative space that is formed in the block structure of the body structure;

wherein the first shackle mortise is sized to receive the first shackle tenon when the shackle inserts into the block structure;

wherein the second shackle mortise is a negative space that is formed in the block structure of the body structure;

wherein the second shackle mortise is sized to receive the second shackle tenon when the shackle inserts into the block structure;

wherein the key cavity is a negative space that is formed in the block structure;

wherein the key cavity forms the space that the key structure inserts into;

wherein the key cavity further forms the space that allows the key structure to interact with the plurality of lock mechanisms to release the lock that binds the first object to the second object;

wherein the key cavity further comprises a key slot, a master cavity, and an expansion cavity;

wherein the key slot is an aperture formed through the exterior surface of the block structure;

wherein the key slot forms a port that allows the key structure to insert into the plurality of lock mechanisms;

wherein the key slot is sized such that the master blade structure will insert into the key slot when both the first blade structure and the second blade structure are contained within the master blade;

wherein the master blade structure, the master blade, and the first blade structure, and the second blade structure are described elsewhere in this disclosure;

wherein the master cavity is the space of the key cavity through which the master blade structure inserts to reach the expansion cavity;

wherein the expansion cavity is the space within the key cavity where the plurality of lock mechanisms are located;

wherein the expansion cavity further provides the space that allows the first blade structure and the second blade structure to rotate away from the master blade such that the first blade structure and the second blade structure can interact with the plurality of lock mechanisms.

13. The lock with key having expanding arm elements according to claim 12 wherein the shackle further comprises a first shackle tenon, a second shackle tenon, a first shackle notch, a second shackle notch, and a shackle spring;

wherein the first shackle tenon is a congruent end of the non-Euclidean structure of the shackle;

wherein the first shackle tenon is the congruent end of the shackle that inserts into the first shackle mortise;

wherein the second shackle tenon is a congruent end of the non-Euclidean structure of the shackle;

wherein the second shackle tenon is the congruent end of the shackle that inserts into the second shackle mortise;

wherein the second shackle tenon of the shackle always remains in the second shackle mortise;

wherein the second shackle tenon moves within the second shackle mortise;

wherein the first shackle notch is a negative space that is formed in the lateral face of the non-Euclidean structure of the shackle;

wherein the first shackle notch is positioned proximal to the first shackle tenon;

wherein the first shackle notch is positioned such that the first latch mechanism of the first lock mechanism inserts into the first shackle notch to lock the shackle into position;

wherein the first lock mechanism removes the first latch mechanism from the first shackle notch to release the lock on the shackle;

wherein the second shackle notch is a negative space that is formed in the lateral face of the non-Euclidean structure of the shackle;

wherein the second shackle notch is positioned proximal to the second shackle tenon;

wherein the second shackle notch is positioned such that the second latch mechanism of the second lock mechanism inserts into the second shackle notch to lock the shackle into position;

wherein the second lock mechanism removes the second latch mechanism from the second shackle notch to release the lock on the shackle;

wherein the shackle spring is a compression spring;

wherein the shackle spring mounts in the second shackle mortise of the block structure;

wherein the shackle deforms the shackle spring when the shackle moves into the locked position;

wherein the shackle spring pushes the shackle of the block structure when the lock on the plurality of lock mechanisms release the lock on the shackle.

14. The lock with key having expanding arm elements according to claim 13 wherein the plurality of lock mechanisms further comprises a first lock mechanism and a second lock mechanism;

wherein the first lock mechanism is a mechanical structure;

wherein the first lock mechanism locks the shackle into position such that the shackle binds the first object to the second object;

wherein the first lock mechanism mounts in the expansion cavity such that the first blade structure interacts with the first lock mechanism to release the lock on the shackle;

wherein the first lock mechanism further comprises a first plug, a first tumbler set, and a first mechanical linkage;

wherein the first plug is a c-channel that mounts in the expansion cavity such that the first plug will rotate within the expansion cavity;

wherein the first plug is sized and positioned such that the first blade structure will insert into the open lateral face of the first plug when the first lock mechanism locks the shackle into position;

wherein the key structure will rotate the first blade structure while the first blade structure is contained within the first plug such that the rotation of the first blade structure will rotate the first plug;

wherein the rotation of the first blade structure by the key structure while the first blade structure is contained within the first plug;

wherein the position of the first blade structure within the first plug is selected such that the first blade structure will appropriately interact with the first tumbler set while the first blade structure is inserted into the first plug;

wherein the first plug further comprises a first cam tab;

wherein the first cam tab is a mechanical structure that attaches to the first plug such that the rotation of the first plug will rotate the first cam tab;

wherein the first tumbler set is a set of lock tumblers that lock the first plug into a fixed position within the expansion cavity when the shackle is in the locked position;

wherein the first tumbler set is designed to interact with the first blade structure such that the rotation of the first tumbler set will not inhibit the rotation of the first plug within the expansion cavity when the appropriately keyed structure is used as the first blade structure;

wherein the first mechanical linkage is a mechanical structure;

wherein the first mechanical linkage forms a linkage between the first plug and the first shackle notch of the shackle such that the rotation of the first blade structure will rotate the first plug such that the lock of the first lock mechanism on the first shackle notch is released;

wherein the first mechanical linkage further comprises a first latch mechanism, a first compression spring, and a first plug tang;

wherein the first plug tang is an extension structure that mechanically attaches the first cam tab to the first latch mechanism;

wherein the first plug tang attaches to the first cam tab such that the rotation of the first plug pulls the first latch mechanism away from the first shackle notch to release the lock on the shackle;

wherein the first latch mechanism is a mechanical structure that is geometrically similar to the first shackle notch;

wherein the first latch mechanism and the first shackle notch are formed such that the insertion of the first latch mechanism into the first shackle notch will lock the shackle into a fixed position;

wherein the first compression spring is an energy storage device;

wherein the rotation of the first plug deforms the first compression spring as the first plug simultaneously pulls the first latch mechanism out of the first shackle notch;

wherein the first compression spring provides the motive forces that assist in reinsertion of the first latch mechanism into the first shackle notch the next time the shackle is locked into position;

wherein the second lock mechanism is a mechanical structure;

wherein the second lock mechanism locks the shackle into position such that the shackle binds the first object to the second object;

wherein the second lock mechanism mounts in the expansion cavity such that the second blade structure interacts with the second lock mechanism to release the lock on the shackle;

wherein the second lock mechanism further comprises a second plug, a second tumbler set, and a second mechanical linkage;

wherein the second plug is a c-channel that mounts in the expansion cavity such that the second plug will rotate within the expansion cavity;

wherein the second plug is sized and positioned such that the second blade structure will insert into the open lateral face of the second plug when the second lock mechanism locks the shackle into position;

wherein the key structure will rotate the second blade structure while the second blade structure is contained within the second plug such that the rotation of the second blade structure will rotate the second plug;

wherein the rotation of the second blade structure by the key structure while the second blade structure is contained within the second plug;

wherein the position of the second blade structure within the second plug is selected such that the second blade structure will appropriately interact with the second tumbler set while the second blade structure is inserted into the second plug;

wherein the second plug further comprises a second cam tab;

wherein the second cam tab is a mechanical structure that attaches to the second plug such that the rotation of the second plug will rotate the second cam tab;

wherein the second tumbler set is a set of lock tumblers that lock the second plug into a fixed position within the expansion cavity when the shackle is in the locked position;

wherein the second tumbler set is designed to interact with the second blade structure such that the rotation of the second tumbler set will not inhibit the rotation of the second plug within the expansion cavity when the appropriately keyed structure is used as the second blade structure;

wherein the second mechanical linkage is a mechanical structure;

wherein the second mechanical linkage forms a linkage between the second plug and the second shackle notch of the shackle such that the rotation of the second blade structure will rotate the second plug such that the lock of the second lock mechanism on the second shackle notch is released;

wherein the second mechanical linkage further comprises a second latch mechanism, a second compression spring, and a second plug tang;

wherein the second plug tang is an extension structure that mechanically attaches the second cam tab to the second latch mechanism;

wherein the second plug tang attaches to the second cam tab such that the rotation of the second plug pulls the second latch mechanism away from the second shackle notch to release the lock on the shackle;

wherein the second latch mechanism is a mechanical structure that is geometrically similar to the second shackle notch;

wherein the second latch mechanism and the second shackle notch are formed such that the insertion of the second latch mechanism into the second shackle notch will lock the shackle into a fixed position;

wherein the second compression spring is an energy storage device;

wherein the rotation of the second plug deforms the second compression spring as the second plug simultaneously pulls the second latch mechanism out of the second shackle notch;

wherein the second compression spring provides the motive forces that assist in reinsertion of the second latch mechanism into the second shackle notch the next time the shackle is locked into position.

15. The lock with key having expanding arm elements according to claim 14 wherein the master blade structure further comprises a master blade, a first blade structure, and a second blade structure;

wherein the master blade forms the exterior structure of the master blade structure;

wherein the master blade is a disk shaped structure;

wherein the master blade has a semi-enclosed disk shape;

wherein the master blade is a hollow structure;

wherein the first blade structure attaches to the master blade such that the first blade structure rotates into and out of the master blade;

wherein the second blade structure attaches to the master blade such that the second blade structure rotates into and out of the master blade;

wherein the first blade structure is a mechanical structure;

wherein the first blade structure has a disk shape;

wherein the first blade structure inserts into the first plug of the first lock mechanism;

wherein the first blade structure interacts with the first tumbler set of the first lock mechanism when the first blade structure is inserted in the first plug;

wherein the interaction between the first blade structure and the first tumbler set allows the first blade structure to rotate the first plug through the first tumbler set of the first lock mechanism;

wherein the first blade structure physically attaches to the first spherical bevel gear of the bevel gear structure such that the rotation of the first spherical bevel gear rotates the first blade structure;

wherein the rotation of the first spherical bevel gear provides the motive forces required by the first blade structure to rotate the first plug of the first lock mechanism;

wherein the first blade structure further comprises a first extension shaft, a first blade, and a first plurality of teeth;

wherein the first extension shaft is an extension structure;

wherein the first extension shaft is a rigid structure;

wherein the first extension shaft mechanically attaches the first spherical bevel gear to the first blade such that the rotation of the first extension shaft transfers the rotation of the first spherical bevel gear to the first blade;

wherein the first blade has a disk shape;

wherein the first blade is sized such that the first blade inserts into the first plug of the first lock mechanism;

wherein the first blade attaches to the first extension shaft such that the rotation of the first extension shaft simultaneously rotates the first blade and the first plug within the key cavity;

wherein the first plurality of teeth is an irregular surface that is formed on the lateral face of the disk structure of the first blade;

wherein the first plurality of teeth is positioned on the first blade such that the first plurality of teeth will interact with the first tumbler set of the first lock mechanism when the first blade inserts into the first plug;

wherein the second blade structure is a mechanical structure;

wherein the second blade structure has a disk shape;

wherein the second blade structure inserts into the second plug of the second lock mechanism;

wherein the second blade structure interacts with the second tumbler set of the second lock mechanism when the second blade structure is inserted in the second plug;

wherein the interaction between the second blade structure and the second tumbler set allows the second blade structure to rotate the second plug through the second tumbler set of the second lock mechanism;

wherein the second blade structure physically attaches to the second spherical bevel gear of the bevel gear structure such that the rotation of the second spherical bevel gear rotates the second blade structure;

wherein the rotation of the second spherical bevel gear provides the motive forces required by the second blade structure to rotate the second plug of the second lock mechanism;

wherein the second blade structure further comprises a second extension shaft, a second blade, and a second plurality of teeth;

wherein the second extension shaft is an extension structure;

wherein the second extension shaft is a rigid structure;

wherein the second extension shaft mechanically attaches the second spherical bevel gear to the second blade such that the rotation of the second extension shaft transfers the rotation of the second spherical bevel gear to the second blade;

wherein the second blade has a disk shape;

wherein the second blade is sized such that the second blade inserts into the second plug of the second lock mechanism;

wherein the second blade attaches to the second extension shaft such that the rotation of the second extension shaft simultaneously rotates the second blade and the second plug within the key cavity;

wherein the second plurality of teeth is an irregular surface that is formed on the lateral face of the disk structure of the second blade;

wherein the second plurality of teeth is positioned on the second blade such that the second plurality of teeth will interact with the second tumbler set of the second lock mechanism when the second blade inserts into the second plug.

16. The lock with key having expanding arm elements according to claim 15 wherein the retaining structure rotates the first blade structure and the second blade structure into and out of the master blade structure;

wherein the retaining structure mechanically releases the first blade structure and the second blade structure from the master blade structure such that the first blade structure and the second blade structure rotate through the expansion cavity into the first plug and the second plug respectively;

wherein the retaining structure returns the first blade structure and the second blade structure into the master blade structure when the key structure is removed from the body structure;

wherein the retaining structure locks the first blade structure and the second blade structure into position within the master blade structure when the key structure is removed from the body structure.

17. The lock with key having expanding arm elements according to claim 16 wherein the bevel gear structure comprises a first bevel gear, a second bevel gear, a third bevel gear, a first spherical bevel gear, and a second spherical bevel gear;

wherein the first bevel gear is a bevel gear;

wherein the first bevel gear forms a mechanical linkage between the third bevel gear and the first spherical bevel gear such that the rotation of the third bevel gear will rotate the first spherical bevel gear;

wherein the second bevel gear is a bevel gear;

wherein the second bevel gear forms a mechanical linkage between the third bevel gear and the second spherical bevel gear such that the rotation of the third bevel gear will rotate the second spherical bevel gear;

wherein the third bevel gear is a bevel gear;

wherein the third bevel gear attaches to a congruent end of the master shaft such that the rotation of the master shaft rotates the third bevel gear;

wherein the rotation of the third bevel gear rotates the first bevel gear;

wherein the rotation of the third bevel gear rotates the second bevel gear;

wherein the first spherical bevel gear is a spherically shaped bevel gear;

wherein the first spherical bevel gear forms a mechanical linkage between the first bevel gear and the first extension shaft such that the rotation of the first bevel gear will rotate the first extension shaft;

wherein the second spherical bevel gear is a spherically shaped bevel gear;

wherein the second spherical bevel gear forms a mechanical linkage between the second bevel gear and the second extension shaft such that the rotation of the second bevel gear will rotate the second extension shaft.

* * * * *